(12) United States Patent
Nakanishi

(10) Patent No.: US 6,585,262 B2
(45) Date of Patent: Jul. 1, 2003

(54) CONVEYING INTERVAL ADJUSTING METHOD AND APPARATUS

(75) Inventor: Ken Nakanishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/851,080

(22) Filed: May 9, 2001

(65) Prior Publication Data

US 2001/0042673 A1 Nov. 22, 2001

(30) Foreign Application Priority Data

May 12, 2000 (JP) ........................................ 2000-139468

(51) Int. Cl.⁷ ................................................. B65H 5/34
(52) U.S. Cl. ................................... 271/270; 198/460.1
(58) Field of Search .................... 198/460.1, 459.8, 198/461.1, 461.2, 461.3, 419.2, 626.5; 271/270, 182, 202

(56) References Cited

U.S. PATENT DOCUMENTS

| 2,840,224 A | * | 6/1958 | Lelief |
| 3,037,609 A | * | 6/1962 | Steele et al. |
| 3,352,403 A | * | 11/1967 | Blake |
| 3,399,755 A | * | 9/1968 | Bryson et al. |
| 4,124,113 A | | 11/1978 | Trees |
| 4,364,466 A | * | 12/1982 | Mojden ................... 198/461.2 |
| 4,724,946 A | * | 2/1988 | Cinotti ................... 198/419.2 |
| 4,934,510 A | * | 6/1990 | Lutgendorf ................ 198/398 |
| 5,699,651 A | * | 12/1997 | Miller et al. ............. 198/418.7 |

FOREIGN PATENT DOCUMENTS

| JP | 50-99832 | 1/1949 |
| JP | 46-4414 | 2/1971 |
| JP | 49-27408 | 7/1974 |
| JP | 55161741 | 12/1980 |
| JP | 57048557 | 3/1982 |
| JP | 60-151851 U | 10/1985 |
| JP | 06-206647 | 7/1994 |
| JP | 11-019595 | 1/1999 |
| JP | 11-290787 | 10/1999 |

* cited by examiner

Primary Examiner—Christopher P. Ellis
Assistant Examiner—Richard Ridley
(74) Attorney, Agent, or Firm—Young & Thompson

(57) ABSTRACT

Two belts 20a and 20b disposed perpendicularly to a bottom belt 10 passed round and driven by a pair of pulleys 11 and 12, have profile members 23 for accelerating or decelerating conveyed matter conveyed on the bottom belt 10 in contact with the leading or trailing end of the conveyed matter, thus permitting conveying of successive items of conveyed matter at a predetermined conveying interval without clamping the conveyed matter and independently of the thickness of shape thereof.

18 Claims, 7 Drawing Sheets

CONVEYING DIRECTION

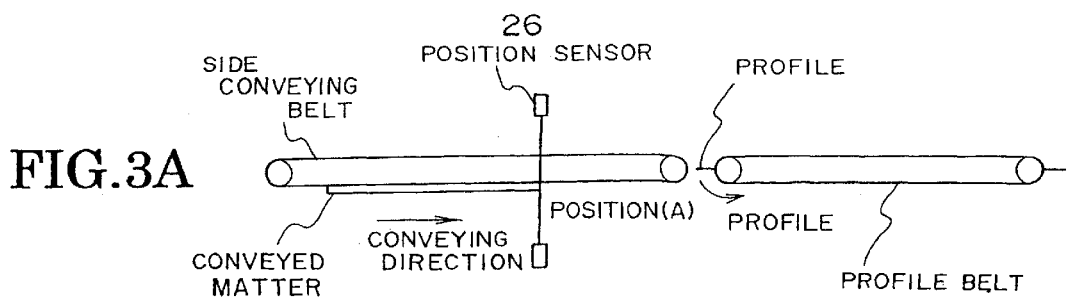
WAITING STATE
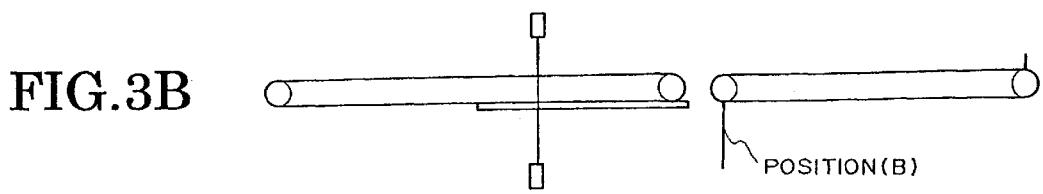
DECELERATING PREPARATION STATE
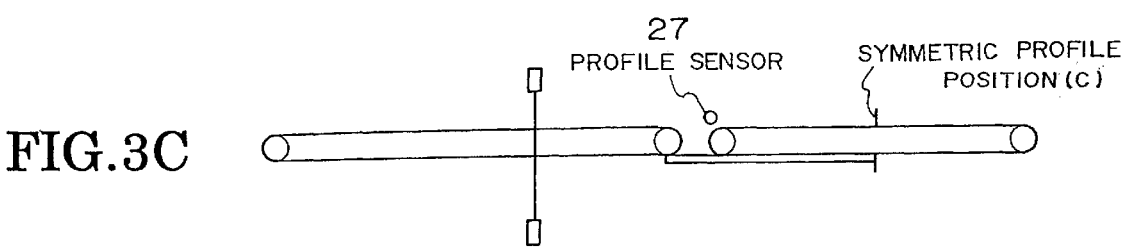
RE-ACCELERATING START
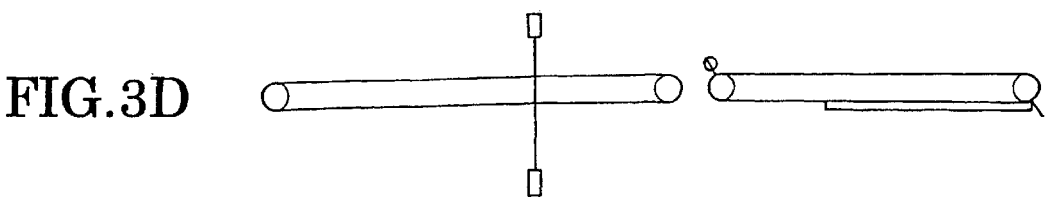
RESTORING TO ORIGINAL POINT PREPARATION STATE
DECELERATING PATTERN OPERATION

WAITING STATE

ACCELERATION START

RE-DECELERATING START

TEMPORAL STOP STATE

RESTORING TO ORIGINAL POINT PREPARATION STATE

ACCELERATING PATTERN OPERATION

PROFILE SPEED DURING DECELERATION OPERATION

PROFILE SPEED DURING ACCELERATION OPERATION

CONVEYING INTERVAL ADJUSTING METHOD AND APPARATUS

BACKGROUND OF THE INVENTION

This application claims benefit of Japanese Patent Application No. 2000-139468 filed on May 12, 2000, the contents of which are incorporated by the reference.

The present invention relates to conveying interval adjusting method and apparatus or to conveying interval adjusting method and apparatus in the conveying of postal matter and like conveyed matter on belt conveyer at a predetermined interval.

In the prior art, conveyers for conveying (or moving) thin postal matter such as postal letter envelops and postal cards from one place to another for such purposes as sorting of postal matter and recognition of postal numbers, are disclosed in, for instance, Japanese Patent Laid-Open No. 6-206647 entitled "Conveyer", Japanese Patent Laid-Open No. 11-19595 entitled "Postal Matter Internal Adjuster, Postal Matter Interval Adjusting Method and Postal Matter Sorter/Accumulator" and Japanese Patent Laid-Open No. 11-290787 entitled "Paper Sheet Conveyor".

FIG. 7 is a side view showing a typical prior art example of such postal matter conveyer. In this conveyer, postal matter (or conveyed matter) 3 is clamped between a pinch roller (which is not movable) 1 and a pinch roller unit (which is movable) 2. The movable pinch roller unit 2 includes a pair of rollers 2a and 2b and an endless belt 2c passed thereon. The conveying interval of the postal matter 3 is determined by adjusting the rotation number of the pinch roller 1 and the pinch roller unit 2.

The above prior art conveying interval adjusting system has the following problems. A first problem is posed by the pinching of the conveyed matter with the pinch rollers. More specifically, with different thicknesses of conveyed matter as the subject of processing, the pinch rollers offer resistance to the conveyed matter, thus leading to troubles in the conveying interval adjustment. Secondly, because of the pinching of the conveyed matter with the pinch rollers, the processing of conveyed matter which is readily subjected to damage is impossible. In this case, it is necessary to sort out the conveyed matter before the conveying thereof.

SUMMARY OF THE INVENTION

An object of the present invention is to provide conveying interval adjusting method and apparatus, which permit adjusting the conveying interval of conveyed matter independently of the thickness and contents of the conveyed matter.

A conveying interval adjusting apparatus according to the present invention comprises a bottom belt movable at a predetermined speed in the direction of conveying conveyed matter, and a belt disposed perpendicularly to the bottom belt, the perpendicular belt having profile members for accelerating or decelerating the conveyed matter conveyed on the bottom belt, thereby adjusting the conveying interval of the conveyed matter. The bottom belt is inclined by 15 degrees to 45 degrees relative to horizontal place with the conveying direction as axis, and thus forms a valley-like conveying path in cooperation with the belt surface of the profile belt. In the preferable embodiment, the two belts with the profile members are each driven by a pair of pulleys which are coaxial (in same axis) with pair pulleys, respectively, for driving the other. The pair pulleys are coupled by synchro-belts to drive motors, respectively. The two belts with the profile members each have a pair of profile members symmetric with each other. Each belt with profile members has two pairs of profile members a pair of profile members for acceleration and the other for deceleration. The profile member for acceleration has a reinforcing member mounted on one side, and the profile member for deceleration has a reinforcing member mounted on the other side.

According to a conveying interval adjusting method for adjusting the conveying interval of conveyed matter by disposing a belt with profile members to be perpendicular to a bottom belt driven at a predetermined speed in the direction of conveying the conveyed matter, and accelerating or decelerating the conveyed matter by causing the profiles of the belt with profile members to be in contact with leading or trailing end of the conveyed matter. In the preferred embodiment, two belts with profile members are provided and driven independently for accelerating or decelerating the conveyed matter.

Other objects and features will be clarified from the following description with reference to attached drawings.

BRIEF DESCRIPTION OF THE DRAWINGS

FIGS. 3A to 3D are drawings for illustrating decelerating operation pattern of the conveying interval adjusting apparatus shown in FIGS. 1 and 2;

PREFERRED EMBODIMENTS OF THE INVENTION

Preferred embodiments of the present invention will now be described with reference to the drawings.

Figure 1:
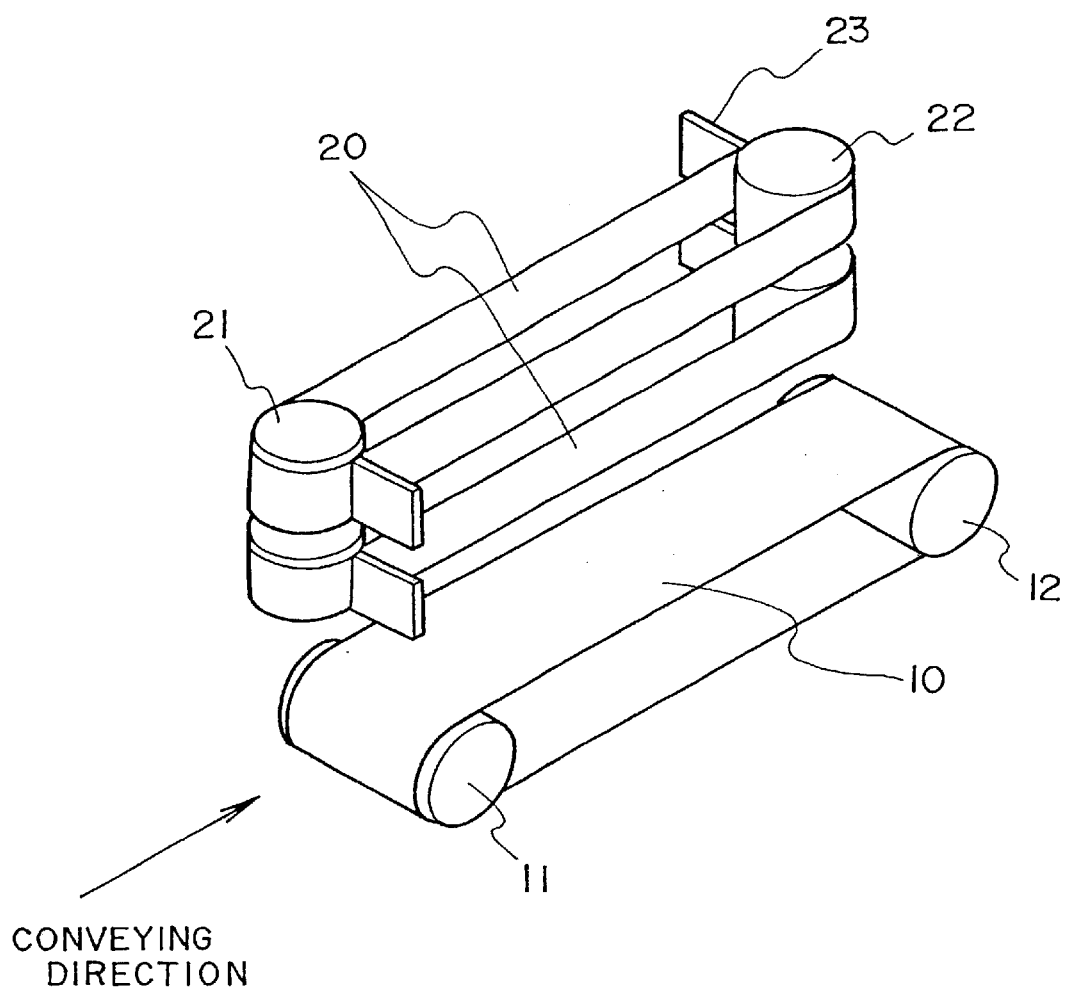
FIG. 1 is a perspective view showing the basic construction of a first embodiment of the conveying interval adjusting apparatus according to the present invention.

FIG. 1 is a perspective view showing the basic construction of a first embodiment of the conveying interval adjusting apparatus according to the present invention. The conveying interval adjusting apparatus comprises a bottom belt 10 passed between a pair of horizontal pulleys 11 and 12 and a profile belt set 20 passed round a pair of vertical pulleys 21 and 22. Each belt in the belt set 20 has a plurality of profile members 23 uniformly spaced apart in its length direction and projecting outwardly from (i.e., perpendicularly to) its surface. In the conveying interval adjusting apparatus shown in FIG. 1, the belt set 20 is constituted by a pair of parallel belts 20. The belts 20 with the profile members 23 are adapted to adjust the conveying interval of conveyed matter (not shown) conveyed on the bottom belt 10 in the conveying direction as shown by arrow by holding the leading or trailing end of the conveyed matter with their profile members 23 such as to decelerate or accelerate the conveyed matter relative to a predetermined conveying speed.

The bottom belt 10 which serves as conveying belt is driven for movement (or excursion) at a constant speed for conveying the conveyed matter with a frictional force exerted thereto at a predetermined conveying speed. The two belts 20 with the profile members 23 alternately act on each item of successively conveyed items of conveyed matter for independently adjusting the conveying interval thereof. In the conveying interval adjusting apparatus according to the present invention, the conveyed matter is thus accelerated or decelerated as its leading or trailing end is pushed by the profile members 23. It is thus possible to adjust the conveying interval to a predetermined interval independently of the thickness or size of the conveyed matter. Also, since the two belts 20 with the profile members 23 are adapted to act alternately on the conveyed matter, it is possible to adjust the conveying interval of conveyed matter, which is conveyed at a small conveying interval.

Particularly, the conveying interval adjusting apparatus shown in FIG. 1 is suited for the conveying interval adjustment of large size postal matter such as flat. In FIG. 1, the belts 20 with the profile members 23 have a function of adjusting the conveying interval of the conveyed matter such as postal matter to a predetermined interval by accelerating or decelerating the conveyed matter.

Figure 2:
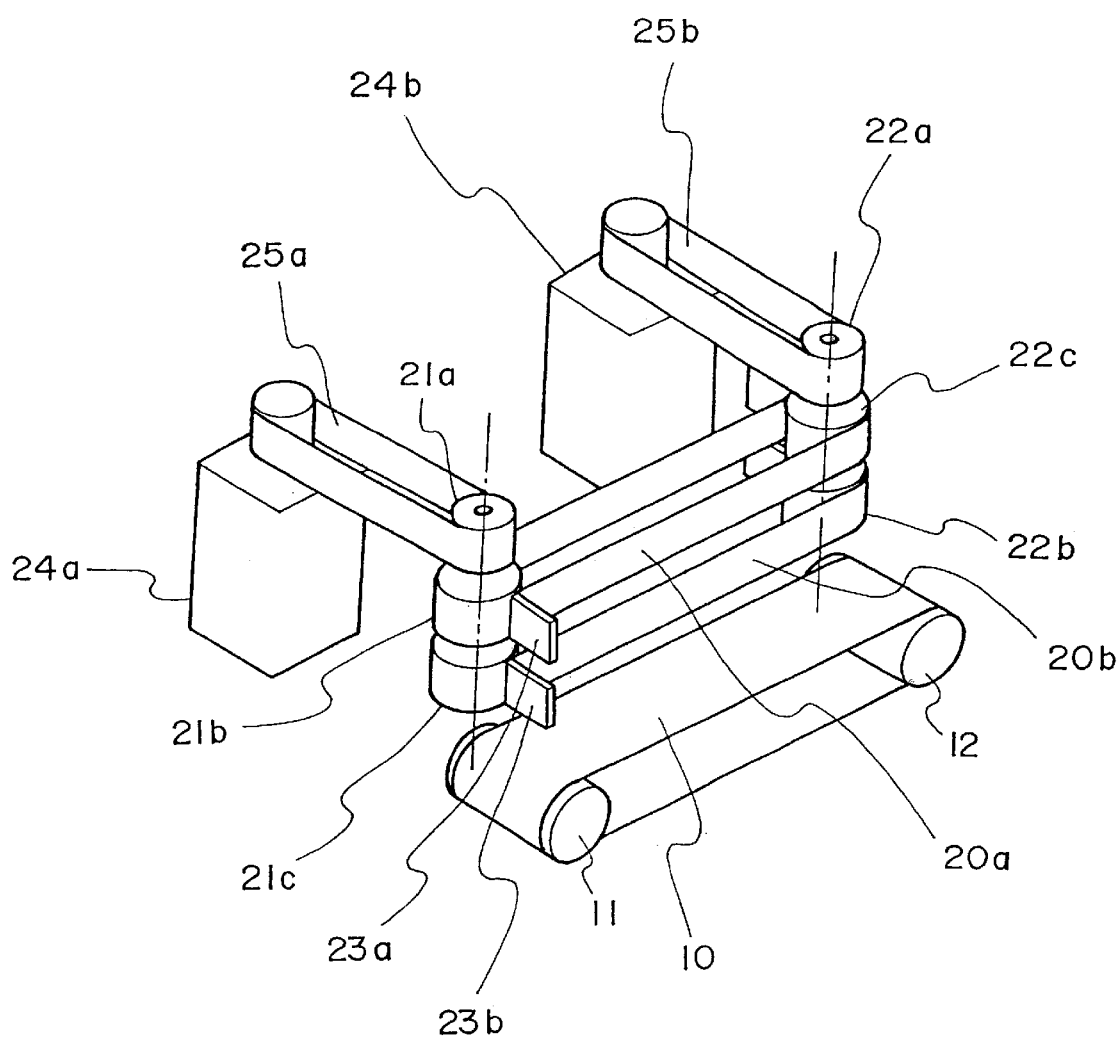
FIG. 2 is a perspective view showing a specific example of the conveying interval adjusting apparatus shown in FIG. 1.

FIG. 2 is a perspective view showing a specific example of the conveying interval adjusting apparatus shown in FIG. 1. Referring to the Figure, a servo motor 24a drives a pulley 21a via a synchro-belt 25a. The pulley 21a is coaxially integral with a pulley 21b, and drives a belt 20a with profile members. A pulley 21c is coaxially coupled via a ball bearing (not shown) to the pulleys 21a and 21b, and can be operated independently thereof. Another servo motor 24b drives a pulley 22a via a synchro-belt 25b. The pulley 22a is coaxially or in same axis integral with a pulley 22b, and drives a belt 20b with profile members. A pulley 22c is coaxially coupled via a ball bearing to the pulleys 22a and 22b, and can be operated independently thereof. It will be seen that the belt 20a with the profile members is driven by the pulley 21b while the pulley 22c is an idler relative to it. Likewise, the belt 20b with the profile members is driven by the pulley 22b while the pulley 21c is an idler relative to it.

The bottom belt 10 and the pulleys 11 and 12 for driving the belt 10, constituting the conveying interval adjusting apparatus as described with reference to FIGS. 1 and 2, are well known to the person skilled in the art, and may be constituted by a well-known conveying belt, and pertinent construction is not described in details.

Figure 4A:
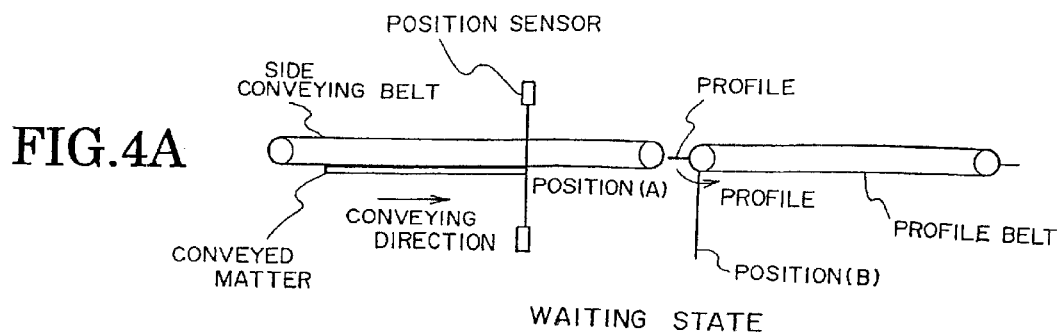
FIGS. 4A to 4E are drawings for illustrating when accelerating the conveyed matter.
Figure 4B:
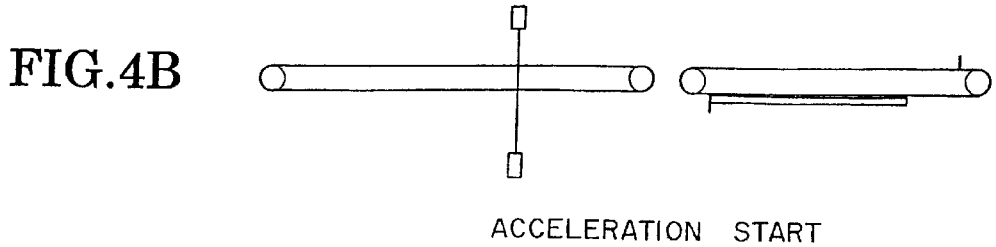
Figure 4C:
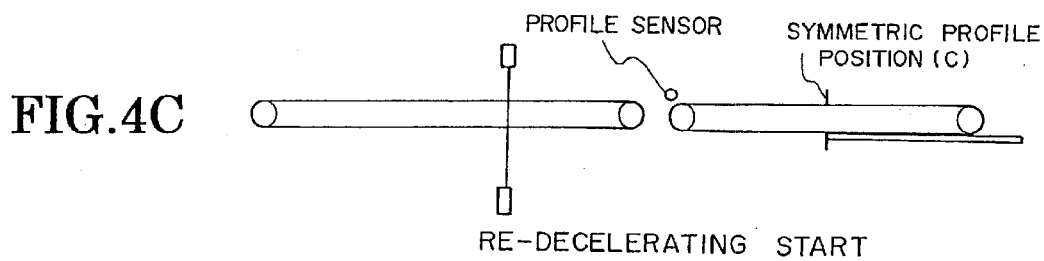
Figure 4D:
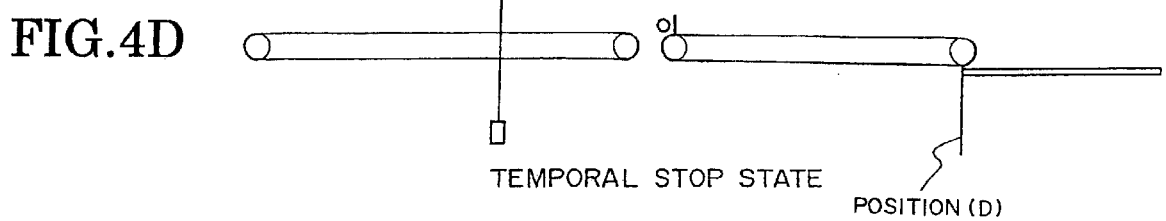
Figure 4E:
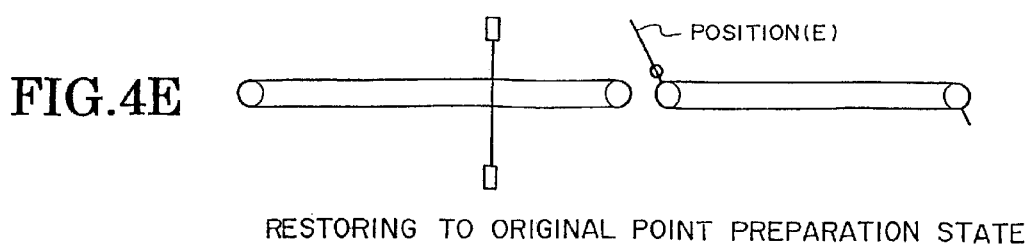
Figure 5A:
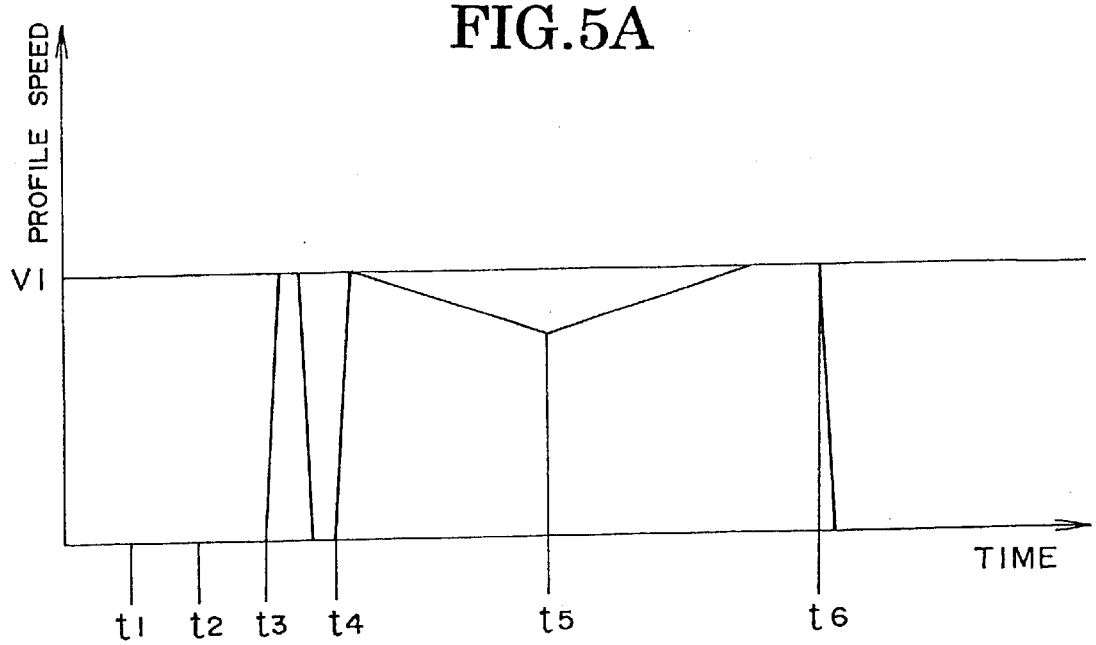
FIGS. 5A and 5B are graphs showing the profile speed during the decelerating and accelerating operations of the conveying interval adjusting apparatus shown in FIGS. 3 and 4.
Figure 5B:
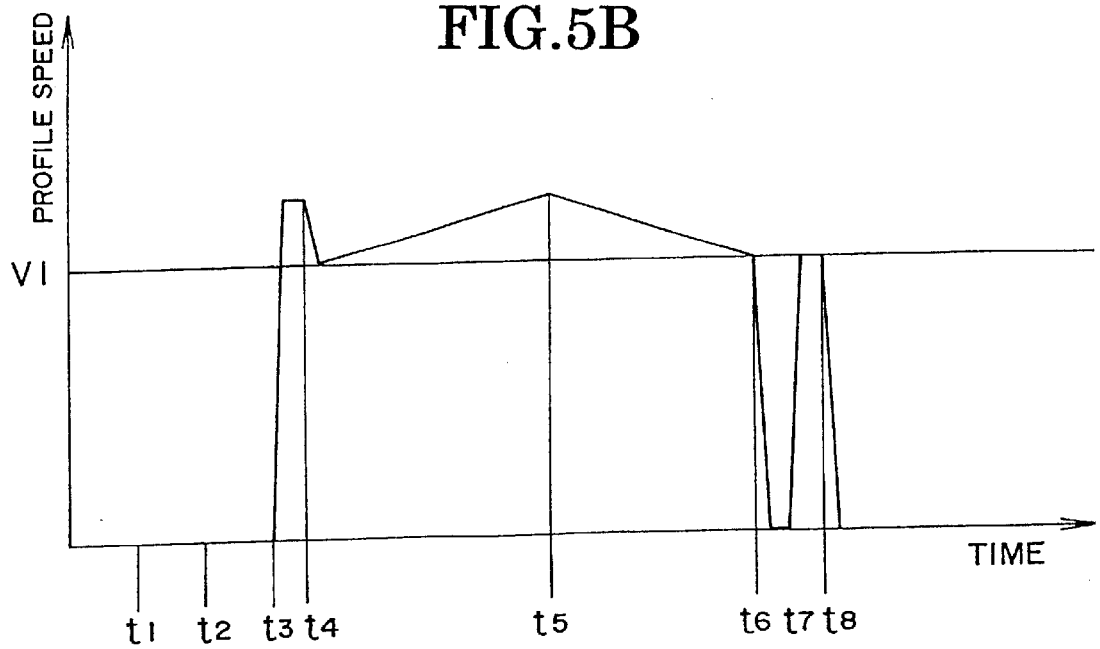

The operation of the conveying interval adjusting apparatus as described with reference to FIGS. 1 and 2 according to the present invention, will now be described with reference to FIGS. 3A to 5B. FIGS. 3A to 3D illustrate operation when decelerating the conveyed matter. FIGS. 4A to 4E illustrate operation when accelerating the conveyed matter. FIG. 5A is a graph showing deceleration pattern curve. FIG. 5B is a graph showing an acceleration pattern curve. Since the two belts 20a and 20b with the profile members are alternately operated independently, the independent operation of each of them will be described here. However, it is assumed that at continuous operation time these two belts alternatively execute the following operations on individual items of the conveyed matter.

In the operations shown in FIGS. 3A to 3D and 4A to 4E, when a controller receives a conveyed matter arrival signal, it computes a deviation from a scheduled passing time of the conveyed matter, and computes the acceleration or deceleration of the conveyed matter according to the computed deviation from the scheduled passing time of the conveyed matter. In this way, the controller determines operation patterns of the belts 20a and 20b with the profile members (see FIGS. 5A and 5B).

The deceleration pattern operation shown in FIGS. 3A to 3D will first be described. FIG. 3A shows a waiting state of the apparatus, FIG. 3B shows a state of deceleration preparation, FIG. 3C shows a state of re-acceleration start, and FIG. 3D shows a state of initial state restoration preparation. In a waiting state at time instant t1 in FIG. 5A, the profile members 23 of the belt 20 are stationary at positions shown in FIG. 3A. That is, the pair profile members 23 are found on the line connecting the pulleys 21 and 22. As conveyed matter is moved by the bottom belt in the conveying direction as shown by arrow, its leading end eventually reaches the position of a position sensor 26 disposed at position (A) in FIG. 3A (at time instant t2 in FIG. 5A). A controller (not shown) receives a passing detection signal from the position sensor 26 at this time, and computes a deviation from the scheduled passing time. When the controller designates a deceleration pattern, the conveyed matter is moved to its position shown in FIG. 3B. When the leading end of the conveyed matter comes to position (B) in FIG. 3B (at time instant t4 in FIG. 5A), the belt 20 starts operation. The belt 20 acquires a speed synchronous to a predetermined conveying speed V1 (see FIG. 5A). Subsequently, the belt 20 is gradually decelerated according to calculated deceleration rate. At a time instant when a profile member 23 is estimated from the deceleration pattern to reach the apparatus center position shown in FIG. 3C (i.e., time instant t5 in FIG. 5A, the belt 20 turns to be re-accelerated, and it is accelerated until it acquires the speed V1. When the profile which is at a position symmetrical with the profile member 23 shown at position (C) in FIG. 3C comes to a profile member sensor 27 at position (D) in FIG. 3D, the controller decides that the profiles 23 are restored to their waiting positions, and stops the belt 20 (at time instant t6 in FIG. 5A).

The acceleration pattern operation shown in FIGS. 4A to 4E will now be described. In a waiting state at time instant t1 in FIG. 5B, the profile members 23 of the belt 20 are stationary. When the leading end of the conveyed matter comes to a sensor 26 at position (A) in FIG. 4A, the controller computes a deviation from the predetermined passing time. When the controller designates an acceleration pattern, the stationary state is held. When the trailing end of the conveyed matter comes to position (B) in FIG. 4A (at time instant t3 in FIG. 5B, the belt 20 starts operation, that is, it is operated at a higher speed than the predetermined conveying speed V1.

At a time instant when a profile member 23 of the belt 20 is estimated to be brought into contact with the trailing end of the conveyed matter (i.e., at t4 in FIG. 5B, the belt 20 is decelerated to the speed V1. Subsequently, the belt 20 is gradually accelerated according to the computed acceleration. At a time instant when the profile member 23 is estimated from the speed pattern shown in FIG. 5B to come to the center position of the system as shown in FIG. 4(C) (i.e., time instant t5 in FIG. 5B), the belt 2 is reduced down to the speed V1. At a time instant when the trailing end of the conveyed matter is estimated from the speed pattern to come to position (D) in FIG. 4D (i.e., time instant t6 in FIG.

5B, the belt 20 is tentatively stopped. This is performed so in order to prevent catching of the conveyed matter by the profile member 23. After a subsequent stationary time, i.e., at time instant t7 in FIG. 5B, the belt 20 is driven again at the speed V1. When the profile member 23 which is symmetrical with the profile member 23 at position (C) in FIG. 4C comes to the profile sensor 27 at the position shown in FIG. 4E (i.e., at time instant t8 in FIG. 5B, the controller decides that the profile members 23 have been restored to their waiting positions (i.e., the initial state), and stops the belt 20.

Figure 6A:
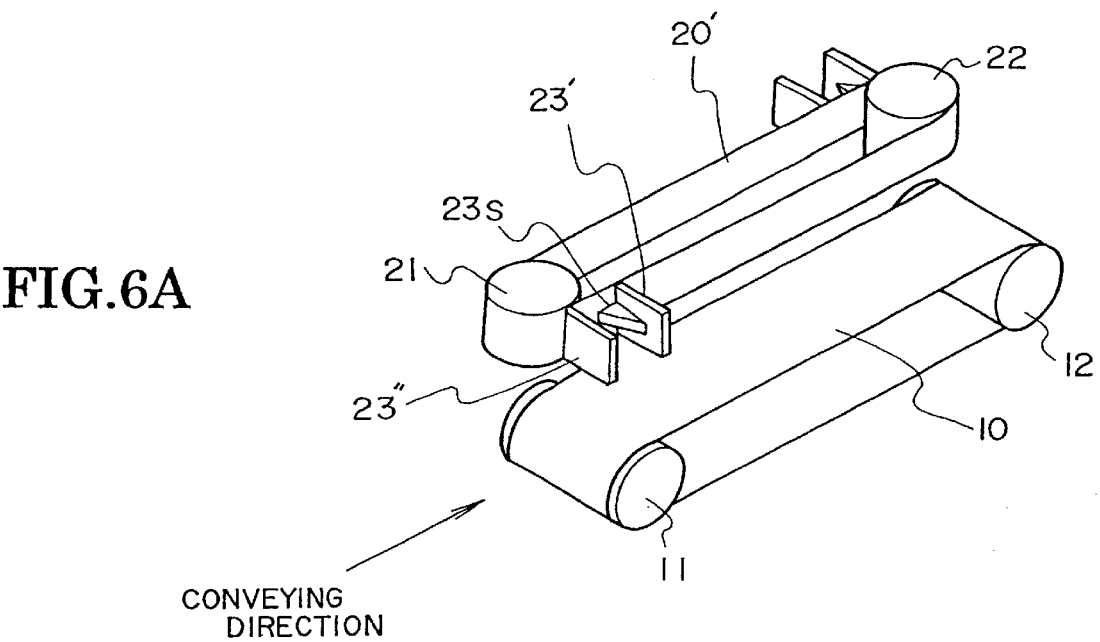
FIGS. 6A and 6B are a perspective view showing the overall construction of the conveying interval adjusting apparatus and a detailed view showing profile member part according to a second embodiment of the present invention.
Figure 6B:
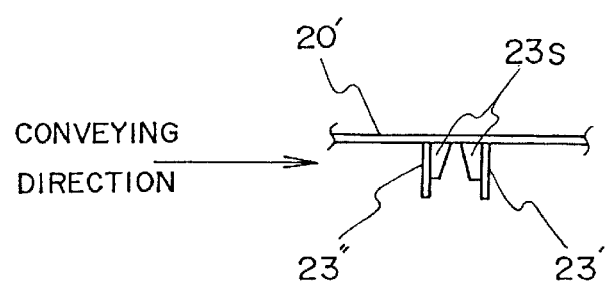
Figure 7:
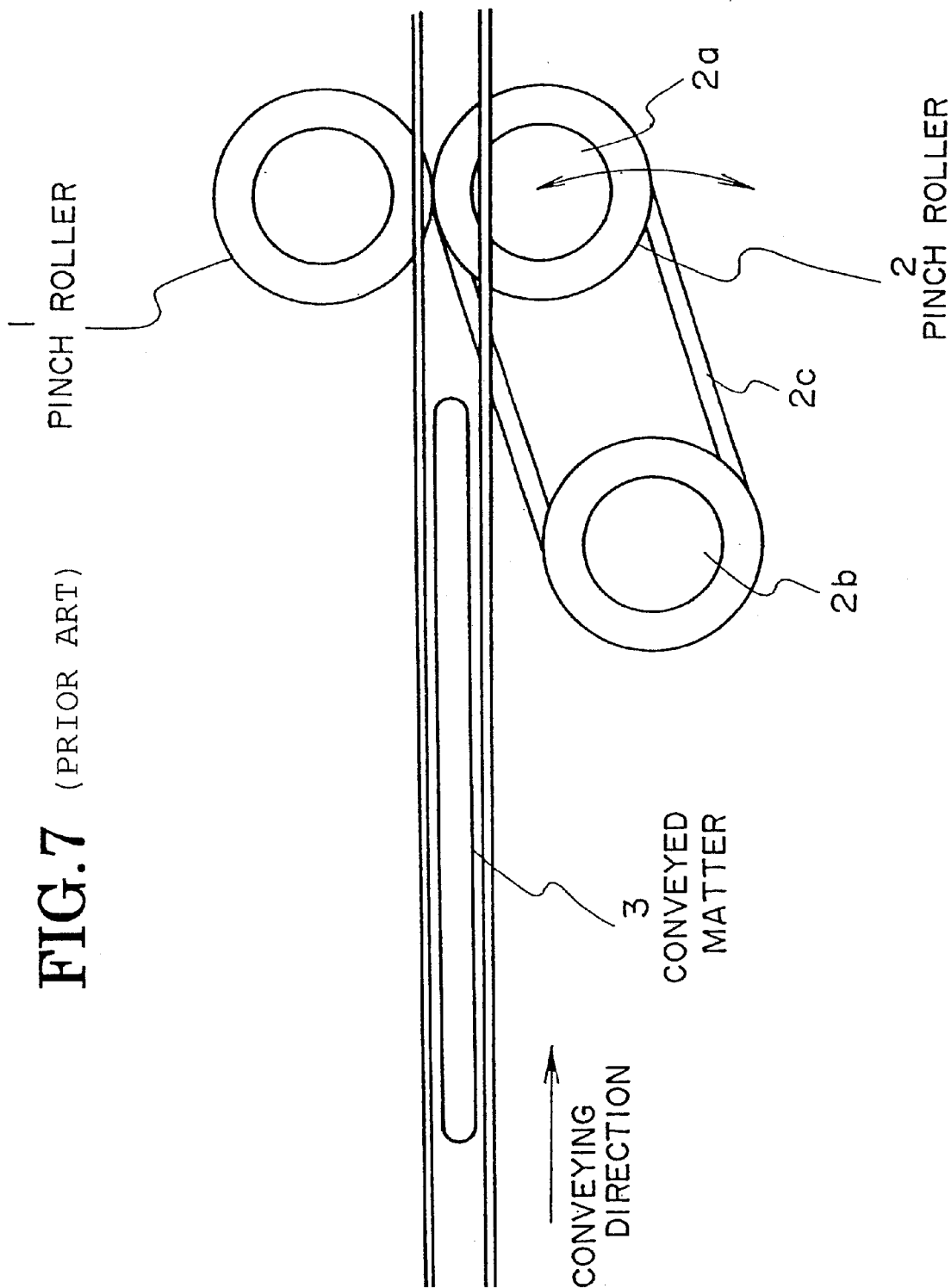
FIG. 7 is a side view showing a typical prior art example of poster matter conveyer.

A different (or second) embodiment of the conveying interval adjusting apparatus according to the present invention will now be described with reference to FIGS. 6A and 6B. The conveying interval adjusting apparatus shown in FIG. 6 is basically the same in construction as the first embodiment described before with reference to FIGS. 1 to 5B. Thus, this embodiment is not described in details, but only the main difference will be described. In this embodiment, the profiles of the belts are modified or improved. FIG. 6A is a perspective view showing the overall construction of this conveying interval adjusting apparatus. FIG. 6(B) is a detailed view showing profile member part.

The conveying interval adjusting apparatus shown in FIG. 6A also comprises a perpendicular arrangement of a bottom belt 10 and a belt 20' with profile members (the drive mechanism for the belts 10 and 20' being not shown). The utmost feature of the conveying interval adjusting apparatus shown in FIGS. 6A and 6B resides in that the profile members of the belt 20 are each constituted by a profile member 23' for acceleration and a profile member 23" for deceleration. The profile members 23' and 23", are substantially the same in construction as the profile members 23 of the belts 20 shown in FIGS. 1 and 2 except for that they each have a reinforcing member 23s. The profile members 23' and 23" for acceleration and deceleration, respectively, are different in the mounting position of the reinforcing member 23s in the conveying direction. The profile member 23' has the reinforcing member 23s mounted on its rear side for preventing it from being deformed by conveyed matter when accelerating the conveyed matter by pushing the trailing end thereof. The profile member 23" for deceleration, on the other hand, has the reinforcing member 23s mounted on the front side for suppressing forward displacement of the conveyed matter conveyed on the bottom belt 10 in the conveying direction by being in contact with the leading end of the conveyed matter. The reinforcing members 23s thus have an effect of increasing the rigidity or mechanical strength of the profile members 23' and 23".

If the profile members 23' and 23" do not have any reinforcing member 23s, they may be deformed to result in unstable operation when adjusting the conveying interval of relatively heavy large conveyed matter. With the conveying interval adjusting apparatus shown in FIG. 6, it is possible to alleviate the weight restriction on the conveyed matter capable of being conveying interval adjusted.

As has been described in the foregoing, the conveying interval adjusting method and apparatus according to the present invention have the following pronounced effects in practice. Firstly, since two belts with profile members are controlled independently of each other, it is possible to cope with conveying intervals, which are small compared to those capable of being coped by a single belt with profile members. Secondly, since the profile members are used for acceleration and deceleration in dependence on the extent of conveying interval adjustment, only one servo motor can cope with both positive and negative extents of conveying interval adjustment. Thirdly, since the conveying interval is adjusted by acceleration or deceleration in dependence on the extent of its adjustment, it is possible to obtain desired adjustment independently of the adjustment extent. Fourthly, since conveyed matter is supported and conveyed on a single surface instead of being clamped, it can be conveyed independently of its thickness and without offering any resistance against its conveying.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A conveying interval adjusting apparatus comprising:
a bottom belt movable at a predetermined speed in the direction of conveying conveyed matter; and
at least one belt disposed perpendicularly to the bottom belt, the at least one perpendicular belt having profile members for selectively accelerating and decelerating the conveyed matter conveyed on the bottom belt, thereby increasing and decreasing a conveying interval of the conveyed matter.

2. A conveying interval adjusting apparatus comprising:
a bottom belt movable at a predetermined speed in the direction of conveying conveyed matter; and
two belts each having profile members are disposed in parallel and driven alternately and independently and are disposed perpendicularly to the bottom belt, the profile members accelerate or decelerate the conveyed matter conveyed on the bottom belt, thereby adjusting the conveying interval of the conveyed matter.

3. A conveying interval adjusting apparatus comprising:
a bottom belt movable at a predetermined speed in the direction of conveying conveyed matter; and
two belts each having profile members are disposed in parallel and driven alternately and independently, are disposed perpendicularly to the bottom belt and are each driven by a pair of pulleys which are coaxial or a same axis with pair pulleys, respectively, for driving the other, the profile members accelerate or decelerate the conveyed matter conveyed on the bottom belt, thereby adjusting the conveying interval of the conveyed matter.

4. A conveying interval adjusting apparatus comprising:
a bottom belt movable at a predetermined speed in the direction of conveying conveyed matter; and
two belts each having profile members are disposed in parallel and driven alternately and independently, are disposed perpendicularly to the bottom belt and are each driven by a pair of pulleys which are coaxial in a same axis with pair pulleys coupled by synchro-belts to drive motors, respectively, for driving the other, the profile members accelerate or decelerate the conveyed matter conveyed on the bottom belt, thereby adjusting the conveying interval of the conveyed matter.

5. The conveying interval adjusting apparatus according to claim 1, wherein the at least one perpendicular belt has a pair of profile members symmetric with each other.

6. The conveying interval adjusting apparatus according to claim 1, wherein each belt with profile members has two pairs of profile members a pair of profile member for acceleration and the other for deceleration.

7. The conveying interval adjusting apparatus according to claim 1, wherein each belt with profile members has two pairs of profile members a pair of profile member for acceleration and the other for deceleration, the profile member for acceleration having a reinforcing member mounted on one side, and the profile member for deceleration having a reinforcing member mounted on the other side.

8. A conveying interval adjusting method for adjusting the conveying interval of conveyed matter, comprising the steps of:

driving a bottom belt at a predetermined speed in the direction of conveying the conveyed matter; and selectively accelerating and decelerating the conveyed matter by causing profiles on at least one perpendicular to the bottom belt to contact with one of leading and trailing ends of the conveyed matter.

9. The conveying interval adjusting method according to claim 8, wherein two belts with profile members are provided and driven independently for selectively accelerating and decelerating the conveyed matter.

10. The conveying interval adjusting apparatus according to claim 2, wherein the two belts with the profile members each have a pair of profile members symmetric with each other.

11. The conveying interval adjusting apparatus according to claim 3, wherein the two belts with the profile members each have a pair of profile members symmetric with each other.

12. The conveying interval adjusting apparatus according to claim 4, wherein the two belts with the profile members each have a pair of profile members symmetric with each other.

13. The conveying interval adjusting apparatus according to claim 2, wherein each belt with profile members has two pairs of profile members a pair of profile member for acceleration and the other for deceleration.

14. The conveying interval adjusting apparatus according to claim 3, wherein each belt with profile members has two pairs of profile members a pair of profile member for acceleration and the other for deceleration.

15. The conveying interval adjusting apparatus according to claim 4, wherein each belt with profile members has two pairs of profile members a pair of profile member for acceleration and the other for deceleration.

16. The conveying interval adjusting apparatus according to claim 2, wherein each belt with profile members has two pairs of profile members a pair of profile member for acceleration and the other for deceleration, the profile member for acceleration having a reinforcing member mounted on one side, and the profile member for deceleration having a reinforcing member mounted on the other side.

17. The conveying interval adjusting apparatus according to claim 3, wherein each belt with profile members has two pairs of profile members a pair of profile member for acceleration and the other for deceleration, the profile member for acceleration having a reinforcing member mounted on one side, and the profile member for deceleration having a reinforcing member mounted on the other side.

18. The conveying interval adjusting apparatus according to claim 4, wherein each belt with profile members has two pairs of profile members a pair of profile member for acceleration and the other for deceleration, the profile member for acceleration having a reinforcing member mounted on one side, and the profile member for deceleration having a reinforcing member mounted on the other side.

* * * * *